Dec. 12, 1933.   W. WELSHAUSEN   1,939,583
AQUARIUM
Original Filed Jan. 6, 1932

Inventor
W. Welshausen.
By Lacy & Lacy,
Attorneys

Patented Dec. 12, 1933

1,939,583

UNITED STATES PATENT OFFICE 1,939,583

AQUARIUM

William Welshausen, Allenhurst, N. J.

Original application January 6, 1932, Serial No. 585,113. Divided and this application July 21, 1932. Serial No. 623,883

3 Claims. (Cl. 261—121)

This invention relates to aquariums and is a divisional application of my co-pending application entitled Aquariums, filed January 6, 1932, Serial Number 585,113.

An object of the present invention is to provide a novel aerating valve having a sump which may be easily reached to empty any water leaking past the aerating valve without disturbing the aquarium.

A further object is to provide an aerating valve which may be quickly mounted on the bottom of the aquarium without extensive alterations when applied to aquariums now in use and which may be easily fabricated into aquariums during manufacture and which will in all instances be water tight so as to require no attention.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

Figure 1:
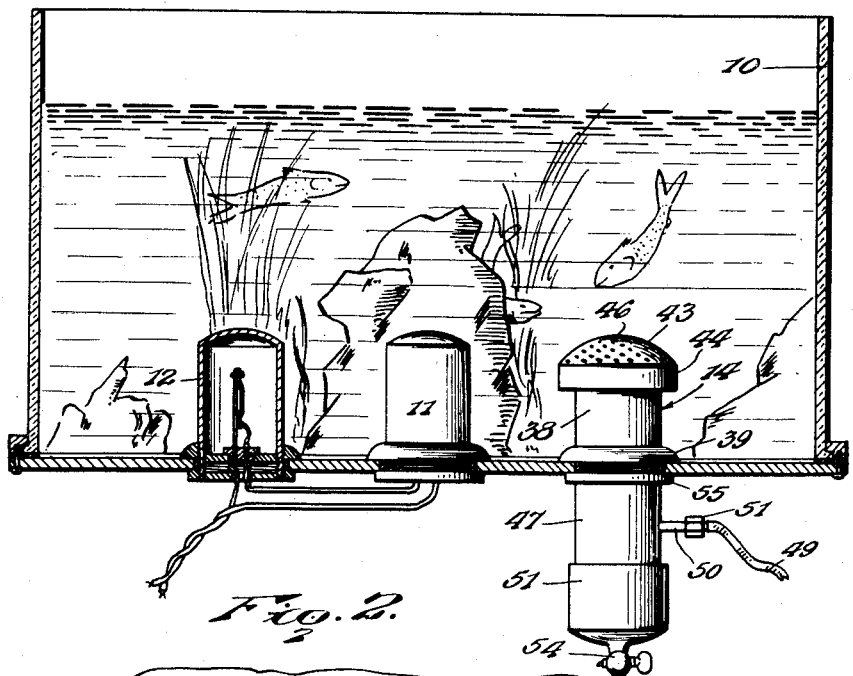
Figure 2:
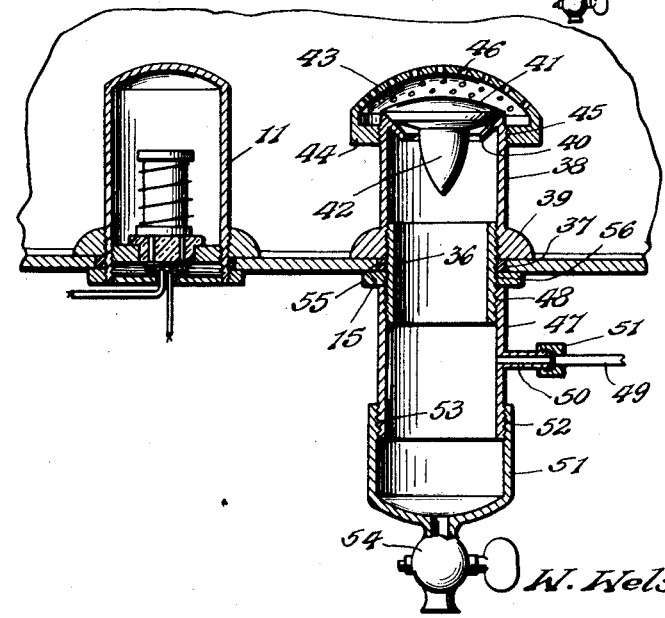

In the accompanying drawing forming part of this specification,

Figure 1 is a longitudinal section through an aquarium equipped with my improved aerating valve, Figure 2 is an enlarged detail section through the aerating valve shown in Figure 1.

Referring now to the drawing in which like characters of reference designate similar parts in the various views, 10 designates an aquarium which may be of any desired type. In the present embodiment, however, I have shown an electric heater 11 and a thermostat 12 for controlling the heater, these devices being described and claimed in said co-pending application.

The aerating valve 14, comprising the subject matter of this invention, embodies an exteriorly threaded tube 36 which is passed into an opening 15 in the bottom of the aquarium, and aquarium cement 37 is pressed into the opening around the exterior of the tube to make a water tight seal.

The aerating valve is provided with a top casing 38 which is preferably formed cylindrical and is threaded interiorly to be screwed on to the upper end of the tube 36. The top casing is provided at the bottom with an exterior stop flange 39 which engages the top face of the aquarium bottom and limits advance of said casing on the tube.

The upper end of the top casing 38 is open and is provided with an inverted substantially frusto-conical valve seat 40 in which is mounted a valve 41 that is held closed by the water pressure in the aquarium. The valve 41 is of the mushroom type and is provided with a conical weight 42 on the underneath side which projects loosely through the port in the valve seat 40 to hold the valve in gravitated or closed position. The edge of the valve 41 is tapered, as shown, to seat snugly against the seat 40, the weight 42 maintaining tight contact of the tapered edge of the valve with the seat so that leakage is obviated.

A deflector cap 43 is provided with a flat base 44 having a central threaded opening 45 which is screwed on to the upper end of the casing 38, which latter is provided with screw threads, as shown, for this purpose. The top of the cap is convexed or arched in contour and is provided with a plurality of minute perforations 46 through which the aerating air escapes from the casing into the aquarium. The arched or convexed top of the cap functions to spread the aerating air over a wide funnel shaped area, as will be understood.

For supplying the aerating air to the valve a bottom casing 47 is provided at the upper end of the bore with screw threads 48 adapted to engage the threaded exterior of the tube 36 below the bottom of the aquarium. The bottom casing is connected to a suitable air supply pipe 49 by means of a lateral integral inlet pipe 50 mounted on the side of said bottom casing. A gland nut 51 is carried on the end of the pipe to secure the end of the air supply pipe 49 leakage tight. Air entering the bottom casing through the pipe 50 will pass upward through the top casing 38 and dislodge the valve 41 against the water pressure in the aquarium. The incoming air bubbles up through the perforations 46 in the spreader cap and aerates the water sufficiently to maintain life in the aquarium.

The open bottom of the bottom casing 47 is closed by a flanged cap 51 which is provided at the upper end of its bore with screw threads 52 to engage corresponding exterior screw threads 53 formed on the lower end of said bottom casing 47. The bottom of the cap is provided with a drain cock 54 which may be opened from time to time to drain off any water which may seep downwardly through the casings 38 and 47 when the valve is open and collect in the cap 51 which functions as a sump in addition to closing the lower open end of the bottom casing 48.

It will be observed that a washer 55 is interposed between the top edge of the bottom casing 47 and the bottom face of the aquarium bottom, this washer coacts with the flange 39 on the base of the top casing 38 to secure both casings in tight engagement with the bottom of the aquarium. This washer 55 may, if desired, be formed as an integral flange on the bottom casing 47 to serve the same purpose. However, when a washer is used the washer may be threaded, as shown at 56, to engage the exterior threads of the tube 36 so that the washer may be tightly secured up against the bottom of the aquarium to mount the device on the aquarium bottom before the bottom casing 47 is screwed on to the tube 36. From time to time the washer may be screwed up tight against the bottom face of the aquarium bottom and serves as a jam nut, and this may be done without disturbing the bottom casing 47 or air supply pipe 49.

From the above description it is thought that the construction and operation of my invention will be fully understood without further explanation.

What is claimed is:

1. In an aquarium, an aerating valve comprising a top casing, a bottom casing means for securing the bottom casing to the lower side of the aquarium, a sump carried by the bottom casing below the lower side of the aquarium, a valve in the top casing, means for supplying air to the casings, and a perforated spreader cap carried by the top casing and having an arched top disposed above the valve.

2. An aerating valve for aquariums comprising an exteriorly threaded tube adapted to be passed through an opening in the aquarium, a top casing threaded on to one end of the tube within the aquarium, a bottom casing threaded on to the tube outside of the aquarium and coacting with the tube and top casing in forming a continuous air passage, a cap closing the end of the bottom casing and forming a sump, a valve carried by the top casing and adapted to be held closed by a water pressure, a spreader cap carried by the top casing and having a perforated arched portion disposed above the valve, and means connected with the bottom casing for supplying air to the valve.

3. An aerating valve for aquariums comprising an exteriorly threaded tube adapted to be passed through an opening in the aquarium bottom, a casing threaded on to the upper end of the tube within the aquarium and having a base flange adapted to seat against the top face of the aquarium bottom, an inverted substantially frusto-conical valve seat carried by the upper end of the casing having a port, a mushroom valve having a tapered edge bearing against said seat and having a weight passing through the valve port in said seat, said valve being adapted to be held closed by the combined action of the water pressure in the aquarium and the weight of said weight, a washer threaded on to said tube and bearing against the bottom face of the aquarium bottom and coacting with the base flange of said casing to firmly secure the tube and casing upright on the aquarium bottom, a second casing screwed on to the lower end of said tube below said washer and having a lateral air supply, a cap screwed on to the lower end of the second named casing and forming a sump, a drain cock carried by the cap, and a spreader cap carried by the top of the first named casing and having an arched perforated portion above said valve.

WILLIAM WELSHAUSEN. [L. S.]